United States Patent Office 2,846,194
Patented Aug. 5, 1958

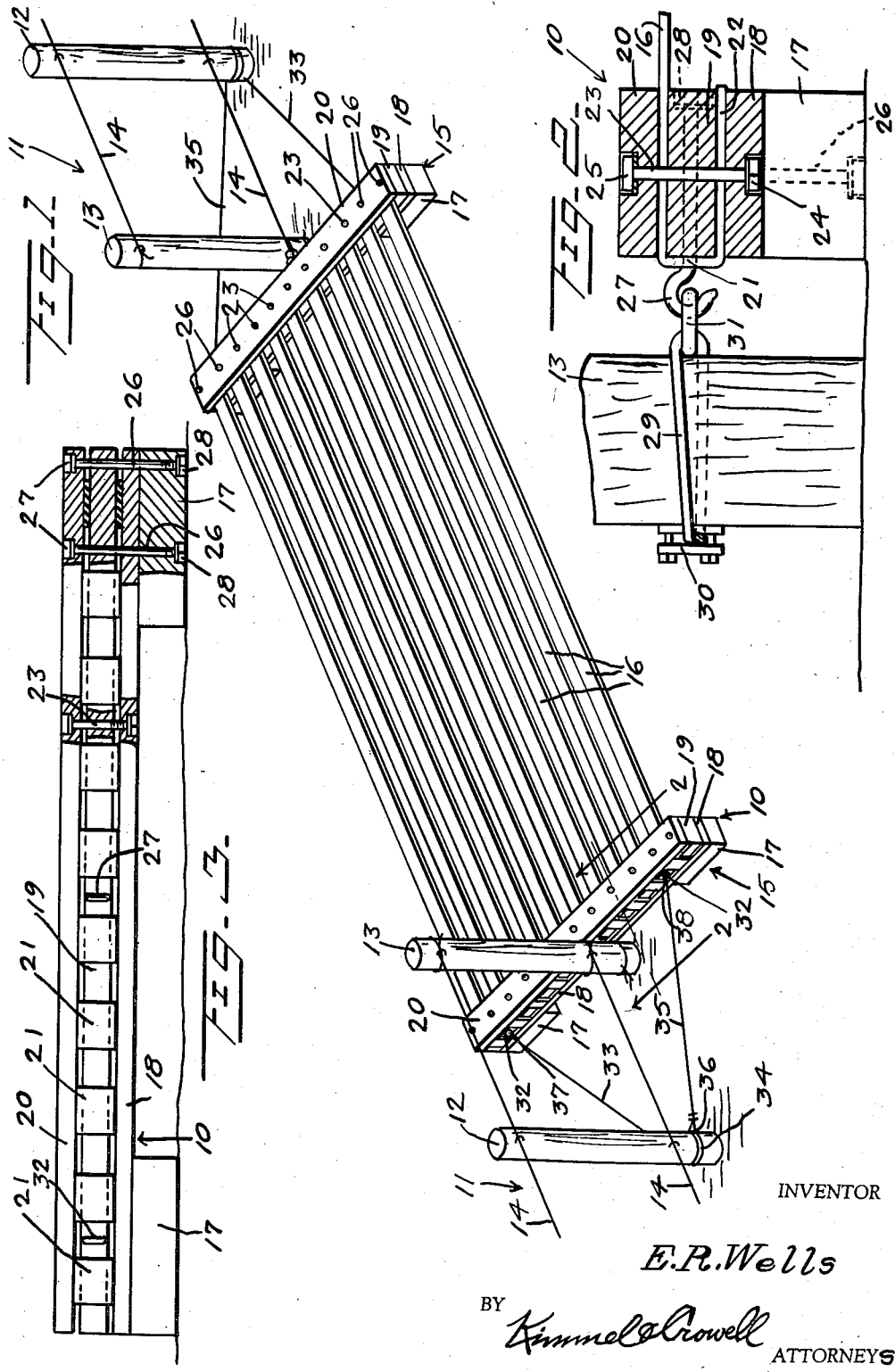

2,846,194
CATTLE GUARD
Ernest R. Wells, Joseph, Oreg.
Application July 16, 1956, Serial No. 598,093
1 Claim. (Cl. 256—14)

The present invention relates to cattle guards, and more particularly to cattle guards for use in fences to permit the passage of vehicles and persons walking while simultaneously forming an effective barrier for the passage of cattle.

The primary object of the invention is to provide a cattle guard which will permit the passage of a motor vehicle without injury thereto and without damage to the cattle guard and which will require extremely little servicing during its effective life.

Another object of the invention is to provide a cattle guard of the class described above which permits the passage of vehicles while remaining in cattle guarding position.

A further object of the invention is to provide a cattle guard for use in fence lines which can be attached to the posts of an ordinary fence without requiring special fittings.

A still further object of the invention is to provide a cattle guard of the class described above which is inexpensive to manufacture, simple to erect, and serviceable in hard usage.

Other objects and advantages will become apparent in the following specification when considered in the light of the attached drawings, in which:

Figure 1 is a perspective view of the invention shown installed in a fence line.

Figure 2 is an enlarged fragmentary vertical cross-section taken along the line 2—2 of Figure 1, looking in the direction of the arrows.

Figure 3 is an enlarged end elevation of the invention shown partly broken away and in section for convenience of illustration.

Referring now to the drawings in detail wherein like reference characters indicate like parts throughout the several figures, the reference numeral 10 indicates generally a cattle guard constructed in accordance with the invention.

The cattle guard 10 is adapted to be positioned in a fence line generally indicated at 11. The fence line 11 includes spaced line posts 12 and spaced end posts 13 with the end posts 13 having sufficient space therebetween to provide an access opening for the passage of vehicles.

The fence line 11 includes wire 14 which may be of double stranded barbed construction, or any other desired construction to form the fence 11.

The cattle guard 10 includes a pair of spaced apart parallel end frames generally indicated at the reference numeral 15, and a plurality of spaced parallel elastic members 16 extending between the end frames 15. Each end frame 15 comprises a pair of spaced apart support members 17, a lower clamp plate 18 having the opposite ends thereof supported on the support members 17, a central plate 19 positioned above and coextensive with the clamp plate 18, and a top clamp plate 20 positioned above the central plate 19 and coextensive therewith.

The elastic members 16 extend between the central plate 19 and the top clamp plate 20 then have a vertical depending portion 21 extending downwardly over the outer face of the central plate 19 and having a reverted end portion 22 extending inwardly between the central plate 19 and the lower clamp plate 18, as seen in Figure 2.

A plurality of bolts 23 extend through the lower clamp plate 18, the central plate 19, and the upper clamp plate 20 so that nuts 24 applied thereto will clamp the clamp plates 18 and 20 tightly against the flexible member 16, binding it to the central plate 19. The heads 25 of the bolts 23 and the nuts 24 are each recessed into the upper clamp plate 20 and lower clamp plate 18, respectively, to provide a smooth upper and lower surface.

Bolts 26 extend downwardly through the upper clamp plate 20, the central plate 19, lower clamp plate 18, and support members 17 to secure the support members 17, lower clamp plate 18, central plate 19 and upper clamp plate 20 together. Obviously, the heads 27 and nuts 28 of the bolts 26 may be recessed into the upper clamp plate 20 and support members 17, respectively, when desired. Each of the central plates 19 is provided with a hook 27 which is secured therein by any suitable means such as a nut 28.

A loop of cable 29 is secured by means of cable clamp 30 in encompassing relation to the post 13 and have a ring 31 threaded thereon for cooperative engagement with the hook 27, as best seen in Figure 2. The central plate 19 is further provided with eyes 32 adjacent opposite ends thereof for reasons to be assigned.

A cable 33 has a loop 34 formed in one end thereof in encompassing relation to the post 12 and a cable 35 has a loop 36 formed at one end thereof in encompassing relation to the post 12. The opposite ends 37 and 38, respectively, of the cables 33 and 35 are secured to the eyes 32 on the central plate 19.

By reference now to Figure 1, it should be seen that each of the frame members 15 is secured to one of the posts 12 and one of the posts 13 so that the frame member 15 is supported in position adjacent the post 13 by two separate distinct posts.

In the use and operation of the invention, the flexible members 16 will permit the wheels and tires of a motor vehicle to travel thereover, the resiliency thereof being such that the members 16 can be pressed to the ground so that the vehicle is supported by the ground. Persons desiring to walk past the cattle guard can either step on the members 16 or on the top clamp plate 20 in order to pass the fence 11.

Cattle, preferring a firm footing, are repelled by the resiliency of the members 16 and refuse to walk on the guard 10 under ordinary circumstances. However, in the case of a stampede or a head of cattle going beserk, the resilient members 16 are such that no injury will be caused thereby to cattle inadvertently running into the cattle guard 10.

The flexible members 16 may be made of flat strips of rubber.

The invention not only serves as a cattle guard but also replaces and eliminates the need for a gate since it may be readily unhooked from the fence in order to drive cattle through or to drive through a vehicle such as a Caterpillar tractor which does not have wheels and tires.

Having thus described the preferred embodiment of the invention, it should be understood that numerous structural modifications and adaptations may be resorted to without departing from the scope of the appended claim.

What is claimed is:

A cattle guard comprising a pair of spaced parallel separable clamps, a plurality of spaced parallel elastic members formed of rubber and having the opposite end portions thereof secured in said clamps, means securing each of said clamps to a fence post with said elastic members in spaced relation to the ground, said clamps each comprise a pair of oppositely disposed ground engaging support members, a lower clamp plate positioned in engagement with the upper side of said support members, a central plate positioned against the upper side of said lower clamp plate and coextensive therewith, an upper clamp plate positioned against the upper side of said central plate and coextensive therewith, and means securing said support members, said lower clamp plate, said central plate and said upper plate together in clamping relation to said elastic members, with the end portion of said elastic members extending around said central plate and clamped thereto by said upper and lower clamp plates.

References Cited in the file of this patent

UNITED STATES PATENTS

| | | |
|---|---|---|
| 2,204,121 | Coleman | June 11, 1940 |
| 2,710,173 | Manuel et al. | June 7, 1955 |
| 2,744,728 | Melchert et al. | May 8, 1956 |